3,578,618
VINYL ACETATE-ETHYLENE COPOLYMER AQUEOUS PAINT COMPOSITIONS
Herbert P. Beardsley, Wilmington, Del., assignor to E. I. du Pont de Nemours and Company, Wilmington, Del.
No Drawing. Continuation-in-part of application Ser. No. 664,285, Aug. 30, 1967. This application July 7, 1969, Ser. No. 839,710
Int. Cl. C08f 37/00
U.S. Cl. 260—17          1 Claim

ABSTRACT OF THE DISCLOSURE

Aqueous paint compositions containing vinyl acetate-ethylene copolymers having 5–40 percent ethylene are disclosed. Also, there are disclosed paint compositions wherein the copolymers contain small quantities of carboxylic acids, such as acrylic and methacrylic, which have improved freeze-thaw stability.

CROSS REFERENCE TO RELATED APPLICATIONS

This aplication is a continuation-in-part of U.S. Ser. No. 664,285, filed Aug. 30, 1967, now abandoned.

BACKGROUND OF THE INVENTION

This invention relates to paint compositions useful for the coating of interior and exterior surfaces.

Water-base paints, containing a synthetic polymer or copolymer as the film-forming ingredient, are, of course, well known and have been on the commercial market for many years. Generally, however, these paints are supplied either for interior use or for exterior use. The two uses have different requirements, and economic factors also enter into the picture. Exterior paints have the more rigorous requirements since they are normally exposed to much more severe conditions after they have been applied, particularly temperature conditions. For example, in many areas of the country where such paints are used, summer temperatures above 90° F. are commonly experienced, and in the same areas winter temperatures frequently fall to 0° F. or below. As a result the paint film, to be satisfactory, must not soften so as to become tacky at the high temperatures experienced during the summer months, and it must not become brittle and crack at the low winter temperatures. If the paint film softens during the summer, dirt and other foreign matter adheres to it, and cleaning the paint film becomes very difficult, or, in most cases, impossible, particularly after the film has hardened when the temperature has fallen. The need to avoid cracking of the film is obvious, since a cracked film no longer provides continuous protection for the coated surfaces. This combination of requirements has not been heretofore successfully met by a water base paint which can be applied directly to a raw wood surface, i.e., to the surface of wood which has not previously been painted or otherwise coated. Some success has been achieved by using these water-base paints over wood surfaces which have first been primed by a coating of another composition, generally an oil-base coating composition, or a special water-base composition. The foregoing requirements for an exterior paint have been met in the manner discussed above by means of compositions which are relatively expensive to produce. As a result, they are generally not sold for interior use because they cannot compete commercially with other compositions sold for this purpose. Since interior paint requirements are much less rigid than those for exterior paints, water base paints for interior use can be manufactured from much less expensive ingredients and much more economically. Consequently, for a purely economic point of view, these less expensive paints, which are adequate for interior use but which are wholly inadequate for exterior use, dominate the interior paint market.

There is, therefore, an important need for a water-base paint which can be manufactured relatively inexpensively so that it can compete with interior paints now available, but which can also be used on exterior surfaces. Furthermore, there is an important need for a paint for exterior use which can be successfully applied to raw wood without requiring an underlying priming coat.

SUMMARY OF THE INVENTION

In accordance with the present invention, there is provided a water-base paint containing appropriate pigments and comprising a synthetic copolymer latex in which the film-forming ingredient is a vinyl acetate-ethylene copolymer having a relatively high ethylene content in the copolymer molecule. The paint can also contain appropriate quantities of stabilizers, suspending agents and the like. Thus, the individual components of the water-base paint of the invention, other than the synthetic copolymer latex, are well known materials and articles of commerce used in water-base paints. The use of these materials in a latex of the character described below, however, provided a water-base paint composition having the desirable characteristics and advantages referred to above.

The vinyl acetate-ethylene copolymer latices which are used in accordance with this invention have, as produced, a relatively high solids content, e.g., solids content of 45 to 60%. They can, of course, be easily thinned by the addition of water to lower solids contents of any desired value. Similarly the copolymers have 5–40%, and preferably 10–20%, ethylene content, intrinsic viscosity values of 1 to 2.5 deciliters/g. as measured in benzene at 30° C., and an average particles size, $0.1\mu$ to $2\mu$, and preferably $0.15\mu$ to $1.5\mu$. Also, especially preferred copolymers contain 0.2–5, and preferably 0.4–2, weight percent acrylic or methacrylic acid.

To prepare the vinyl acetate-ethylene copolymer latices for the paint compositions of this invention, vinyl acetate and ethylene can be copolymerized, as disclosed in Netherlands application 6604289, in an aqueous medium under pressures not exceeding 100 atmospheres in the presence of a catalyst and at least one emulsifying agent, the aqueous system being maintained, by a suitable buffering agent, at a pH of 2 to 6. The process can be a batch process which involves first a homogenization period in which substantially all of the vinyl acetate (at least 75% and, preferably, more than 85%) suspended in water is thoroughly agitated in the presence of ethylene under the working pressure to effect solution of the ethylene in the vinyl acetate up to the substantial limit of its solubility under the conditions existing in the reaction zone, while the vinyl acetate is gradually heated to polymerization temperature (usually 30–80° C., and preferably about 50° C.). The homogenization period is followed by a polymerization period during which the catalyst, which consists of a main catalyst or initiator, and may include an activator, is added incrementally, the pressure in the system being maintained substantially constant by application of a constant ethylene pressure.

The preferred procedure for accomplishing the polymerization to prepare the copolymers of the present invention is as follows: Initially a portion of the vinyl acetate, surfactant, and polymerization catalyst is emulsified in water at about room temperature in the polymerization vessel. In general, the vinyl acetate content in the initial portion amounts to about 3–15, preferably 5–10, weight percent of the total amount to be polymerized. Subsequently, the contents of the vessel are pressurized with ethylene to a value, generally below that at which the polymerization is to be accomplished, and the vessel is heated over a period of about 20–60 minutes to the desired polymerization temperature. As the vessel contents are heated, there is a corresponding gradual rise in ethylene pressure in the vessel. While this rise in ethylene pressure may raise the pressure to the value at which it is desired to accomplish polymerization, frequently it is necessary to adjust the pressure to the desired value after polymerization has been initiated. Of course, ethylene is continuously supplied to the vessel during polymerization to maintain the desired pressure. Continuous agitation accompanies the initial heating step and continues throughout the polymerization. During polymerization, the pH is generally maintained at about 2–9, preferably 4.5–8, and, desirably, polymerization is continued until less than about 0.5% of vinyl acetate remains unreacted.

In the preferred process, initial ethylene pressures are generally about 100 to 200 p.s.i. while polymerization pressures, which influence the amount of copolymerized ethylene, are higher, usually about 250–400 p.s.i. For copolymers containing more than about 15 weight percent ethylene, polymerization pressures of about 400–1500 p.s.i. are employed.

Various free-radical forming catalysts can be used in carrying out the polymerization to prepare the present copolymers. For example, combination type catalysts employing both reducing agents and oxidizing agents can be used. The use of this type of combined catalyst is generally referred to in the art as "redox polymerization" or "redox system." The reducing agent is also often referred to as an activator and the oxidizing agent as an initiator. Suitable reducing agents or activators include bisulfites, dithionites, sulfoxylates, or other compounds having reducing properties such as ferrous salts, and tertiary amines; e.g., N-N-dimethyl aniline. The oxidizing agents or initiators include hydrogen peroxide, organic peroxides, such as benzoyl peroxide, t-butyl hydroperoxide and the like; persulfates, such as ammonium or potassium persulfate; perborates, and the like. Specific combination type catalysts or redox systems which can be used include hydrogen peroxide, ammonium persulfate, or potassium persulfate, with sodium metabisulfite, sodium bisulfite, ferrous sulfate, dimethyl aniline, zinc formaldehyde sulfoxylate, sodium dithionite, or sodium formaldehyde sulfoxylate. In general, redox catalyst systems are described, for example, in "Fundamental Principles of Polymerization" by G. F. D'Alelio (John Wiley and Sons, Inc., New York, 1962) pp. 333 et seq. Other types of catalysts, e.g. peroxides and persulfates, are well known in the art and can also be used to polymerize the monomers, with or without the addition of reducing agents or other activating materials. For example, ammonium persulfate can be used as the catalyst without a reducing agent. When using this catalyst without an activator, polymerization is initiated at about 70° C.–75° C. However, frequently the complete polymerization reaction is accomplished at a higher temperature, usually 75–95° C., to realize a faster rate.

The catalyst is generally employed in an amount of 0.1–2%, preferably 0.5–1.5%, based on the weight of vinyl acetate introduced into the system. With a redox catalyst, the initiator is generally present in an amount of 2–5 times that of the activator.

Nonionic or anionic emulsifying agents, as well as mixtures, can be used in preparing the present copolymers. Suitable nonionic emulsifying agents include polyoxyethylene condensates. Polyoxyethylene condensates can be represented by the general formula:

$$R(CH_2—CH_2—O)_nH$$

where R is the residue of a fatty alcohol containing 10–18 carbon atoms, an alkyl phenol, a fatty acid containing 10–18 carbon atoms, an amide, an amine, or a mercaptan, and where $n$ is an integer of 1 or above. Some specific examples of polyoxyethylene condensates which can be used include: polyoxyethylene aliphatic ethers, such as polyoxyethylene lauryl ether, polyoxyethylene oleyl ether, polyoxyethylene hydroabietyl ether and the like; polyoxyethylene alkaryl ethers, such as polyoxyethylene nonylphenyl ether, polyoxyethylene octylphenyl ether and the like; polyoxyethylene esters of higher fatty acids, such as polyoxyethylene laurate, polyoxyethylene oleate and the like, as well as condensates of ethylene oxide with resin acids and tall oil acids; polyoxyethylene amide and amine condensates, such as N-polyoxyethylene lauramide, and N-lauryl-N-polyoxyethylene amine and the like; and polyoxyethylene thio-ethers, such a polyoxyethylene n-dodecyl thio-ether. Other nonionic emulsifiers, such as the sugar esters of long-chain monocarboxylic acids with 8–20 carbon atoms are useful as well.

The nonionic emulsifying agents which can be used also include a series of surface active agents known as "Pluronics." The "Pluronics" have the general formula:

$$HO(C_2H_4O)_a(C_3H_6O)_b(C_2H_4O)_cH$$

where $a$, $b$, and $c$ are integers of 1 or above. As $b$ increases, the compounds become less water soluble or more oil soluble and thus more hydrophobic when $a$ and $c$ remain substantially constant.

In addition, highly suitable are a series of ethylene oxide adducts of acetylenic glycols sold commercially under the name "Surfynols." This class of compounds can be represented by the formula

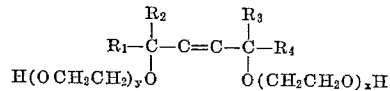

in which $R_1$ and $R_4$ are alkyl radicals containing from 3 to 10 carbon atoms, $R_2$ and $R_3$ are selected from the group consisting of methyl and ethyl, $x$ and $y$ have a sum in the range of 3 to 60, inclusive.

Some examples of nonionic emulsifying agents which can be used are as follows:

A polyoxyethylene nonylphenyl ether having a cloud point of between 126° and 133° F. is marketed under the trade name "Igepal CO–630" and a polyoxyethylene nonylphenyl ether having a cloud point above 212° F. is marketed under the trade name "Igepal CO–887." A similar polyoxyethylene nonylphenyl ether having a cloud point of about 86° F. is marketed under the trade name "Igepal CO–610." A polyoxyethylene octylphenyl ether having a cloud point of between 80° F. and 160° F. is marketed under the trade name "Triton X–100."

A polyoxyethylene oleyl ether having a cloud point of between 80° F. and 160° F. is marketed under the trade name "Atlas O–3915" and a polyoxyethylene lauryl ether having a cloud point above 190° F. is marketed under the trade name "Brij 35."

A polyoxypropylene having a cloud point of about 140° F. is marketed under the trade name "Pluronic L–64," and a polyoxypropylene having a cloud point of about 212° F. is marketed under the trade name "Pluronic F–68." "Pluronic L–64" is a polyoxyethylene-polyoxypropylene glycol conforming to the above general formula for "Pluronics" in which the polyoxypropylene chain has a molecular weight of 1500 to 1800 and the polyoxyethylene content is from 40 to 50 percent of the total weight of the molecule. "Pluronic F–68" is a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of he molecule. The polyoxypropylene "Pluronics" are obained by condensing ehylene oxide on the polyoxypropylene base and the hydrophobic-hydrophilic nature of the resulting compound is controlled by varying the molecular weight of either the hydrophobic base or the hydrophilic portion of the molecule.

Representative of the "Surfynols" are "Surfynol 465" which is an ethylene oxide adduct of 2,4,7,9-tetramethyl decynediol containing an average of 10 moles of ethylene oxide per mole, and "Surfynol 485" which corresponds to "Surfynol 465," but contains an average of 30 moles of ethylene oxide per mole. "Surfynol 465" has a cloud point of about 145° F. and "Surfynol 485" has a cloud point above 212° F.

In the foregoing, cloud points recited are based on 1% aqueous solutions. A single emulsifying agent can be used, or the emulsifying agents can be used in combination. When combinations of emulsifying agents are used, it is advantageous to use a relatively hydrophobic emulsifying agent in combination with a relatively hydrophilic agent. A relatively hydrophobic agent is one having a cloud point in 1% aqueous solution below 190° F. and a relatively hydrophilic agent is one having a cloud point in 1% aqueous solution of 190° F. or above.

Suitable anionic emulsifiers can be characterized by the following: salts of sulfosuccinic acid esters; salts of high alkyl sulfonic acids and alkyl aryl sulfonic acids; and salts of long-chain alkyl monocarboxylic acids.

The concentration range of the total amount of emulsifying agents useful is from 0.5 to 5% based on the aqueous phase of the latex regardless of the solids content. Latex stabilizers are also advantageously used. The stabilizers employed are, in part, governed by the intended particle size of the copolymer. For example, the vinyl acetate-ethylene copolymer latices prepared by the above-described method can have various average particle size ranges, as indicated. When the latices are to have a very small average particle size, e.g., below $0.25\mu$, an ethylenically-unsaturated acid having up to 6 carbon atoms, is advantageously used as the stabilizer. Typical acids of this character are acrylic acid, methacrylic acid, itaconic acid, maleic acid, vinyl sulfonic acid and the like. These unsaturated acids impart increased stability to the latices. They tend to copolymerize with the monomers in the system. The amount of unsaturated acid used is suitably 0.1 to 3% base don viny acetate, preferably 0.2 to 1%.

On the other hand, when the latex is to have an average particle size above $0.25\mu$, a protective colloid can be used in the polymerization mixture as the stabilizing agent, although an unsaturated acid can be used if desired. Various amounts of colloids can be incorporated into the latices as desired, but it is preferred to maintain the colloid concentration at the lowest level possible to insure a coating with good water- and scrub-resistance and yet obtain the desired viscosity. The amount of colloid used will also depend upon the particular colloid employed. Colloids of higher molecular weight tend to produce a latex of a higher viscosity than like amounts of a lower molecular weight colloid. Other properties of the colloids aside from their molecular weight also affect the viscosity of the latices and also the properties of the films formed therefrom. It is advantageous to maintain the colloid content of the latices between about 0.05 and 2% by weight based on the total latex, and hydroxyethyl cellulose is a particularly advantageous colloid when used in the latices, imparting unusually good properties to the polymer latices and to the coatings formed therefrom.

Various other colloids can also be used with the latices of this invention including polyvinyl alcohol, partially-acetylated polyvinyl alcohol, e.g., up to 50% acetylated, casein, hydroxyethyl starch, carboxymethyl cellulose, gum arabic, and the like, as known in the art of synthetic polymer latex technology.

While as mentioned earlier unsaturated acids can be used as latex stabilizers for small particle sizes, it has also been discovered that the use of copolymers containing the acids in paints leads to paints which have an unexpectedly greater degree of freeze-thaw stability than paints formulated from vinyl acetate-ethylene binary copolymers. This superior freeze-thaw stability is not only present in paints with small particle sizes, but with paints containing larger particle sizes as well. Accordingly, for improved paint freeze-thaw stability, copolymers contain 0.2–5, and more preferably 0.4–2, weight percent acrylic or methacrylic acid. Correspondingly, with these preferred copolymers, an ethylene content of 10–20 weight percent is preferred with the balance of the copolymer being vinyl acetate.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range. Ammonium and sodium bicarbonate and diammonium phosphate are preferred buffers because of their compatability with the system and their low cost. The amount of buffer is generally about 0.1 to 0.5% by weight, based on the monomers. Other buffers such as disodium phosphate, sodium acetate, and the like, can, however, also be used.

The particle size of the latex can be regulated by the quantity of non-ionic emulsifying agent or agents employed and by the use or nonuse of a colloidal stabilizing agent. Thus, to obtain smaller particle sizes, greater amounts of emulsifying agents are used and colloidal stabilizing agents are not employed. For example, to provide average particle sizes below about $0.25\mu$, the total amount of non-ionic emulsifying agent should be at least about 2%, based on the aqueous phase of the latex, and no colloidal stabilizing agent should be used, or if a colloidal stabilizing agent is used, only very small amounts should be employed.

On the other hand, when particle sizes of $0.25\mu$ and above are desired, at most about 2% of total emulsifying agent based on the aqueous phase of the latex should be used, and a colloidal stabilizing agent should be included in the amounts previously indicated. As a general rule, the smaller the amount of emulsifying agent employed and the greater the amount of colloidal stabilizing agent included in the latex system, the greater the average particle size. Conversely, the greater the amount of the emulsifying agent employed and the smaller the amount of colloidal stabilizing agent used, including the total absence of the latter, the smaller the average particle size. It will be understood that in each case, the quantity and size values referred to above are all within the ranges of values previously specified in the foregoing description.

The paint can be prepared from the latices by conventional techniques used in the preparation of paints from synthetic polymer latices. However, there is a preferred method which has been found to give the desired paint with ease and with minimum time. In the preferred method of preparation of the paint, the pigment is blended in a mixer with dispersing agent which may comprise a water-soluble non-ionic surface-active agent, a water-soluble anionic pigment dispersant or surface-active agent, and a water-soluble thickener. If desired, the thickener can be omitted from the paste and added during let down.

The above-mentioned ingredients are generally mixed to form a heavy paste for a minimum time of twenty minutes. At this point an antifoam agent, such as tributyl phosphate may be added, if desired.

The paste is then reduced or let down with the latex. Ordinarily, a coalescing solvent is added at this point during the let down in the making of conventional water-base latex paints to improve fusion of the particles into a continuous film, and is advantageously used in making the paint of this invention. For example, diethylene glycol monoethyl ether acetate or the like is suitable as a coalescing solvent.

In general, it is desired that the pH of the completed latex paint be between about 7 and about 10 and preferably between about 7.5 and about 9.

In conventional latex paint formulation it is common practice to add a soluble, hard resinous anti-blocking agent. Conventional latex polymers are thermoplastic in nature. Unless heat or solvents can be used to aid particle coalescence, the polymer particles must be made sufficiently soft to permit coalescence. As a result, the conventional film is inherently lacking in hardness and it is necessary to include in the latex paint a hard, resinous anti-blocking agent which is soluble in the aqueous medium. The anti-blocking agent is one which, upon evaporation of the aqueous medium produces a resin having a softening point significantly higher than that of the resin of which the latex particles are composed. Rosin derivatives such as prepared by esterification or hydrogenation are typical hard resinous anti-blocking agents.

The anti-blocking agent increases the resistance to blocking or sticking between painted surfaces under elevated temperature or high pressure. It is believed that the anti-blocking agent forms a film around the coalescing particles of the polymer of the latex as the paint film is being formed. As the aqueous medium evaporates, the anti-blocking agent hardens, reducing the effect of the thermoplastic latex particles on film hardness. It is a further feature of the present invention that no anti-blocking agent is needed. The film deposited from the latex is itself sufficiently anti-blocking.

The reduction or let down mixture contains some or all of the thickener. Other ingredients, such as fungicides may also be included in the let down or may be previously added. Phenyl mercuric acetate is a suitable fungicide.

Among the suitable pigments which may be used in accordance with this invention are the finely-divided rutile titanium dioxides. Pigments other than rutile titanium dioxide can, however, also be used.

Examples of pigments which may be employed for producing paints in accordance with this invention are titanium dioxide such as that known as "Titanox RA–50"; lithopone such as that known as "Albalith 14"; antimony oxide, barytes; diatomaceous silica, e.g. "Celite 281"; talc such as "Nytal 300"; clay such as that sold under the name "ASP 400"; mica, for example 325 mesh water-ground mica; red, yellow, black and brown iron oxides, e.g., "Irox Red 1380" and "Mapico Brown"; maroon oxides; cadmium red; toluidine red; para red; lithol toner; cadmium yellow; hansa yellow; benzidine yellow; dinitraniline orange; chromium oxide green; phthalocyanine green; phthalocyanine blue; lamp-black; carbon black; mineral black; and luminous pigments.

The pigment should not have a diameter in excess of about $50\mu$, but particle sizes even as little as $0.1\mu$ are suitable. The amount of pigment used can vary but generally 6 pounds per gallon of finished paint is a practical maximum.

Among the preferred water-soluble non-ionic surface active agents used in the preparation of the latex paint are those described above in connection with the preparation of the resin latex. The water-soluble non-ionic surface active agent, when used, is included in amounts between about 0.01 and about 1.5 weight percent, based on the total weight of the latex paint.

The thickener is preferably cellulosic, of which the following are satisfactory: methyl cellulose, hydroxyethyl cellulose and carboxy methyl cellulose. Other thickeners which may be used are polyvinyl alcohol, gum arabic, gum tragacanth, ammonium polyacrylate, sodium polyacrylate, ammonium alginate, and sodium alginate. The thickener is generally included in amounts between about .1 and about 3 weight percent, based on the total weight of the latex paint.

The preferred an-ionic pigment dispersants are those composed of polymerized sodium salts of alkyl naphthalene sulfonic acid. Other an-ionic dispersants which may be used are a sodium salt of polymerized alkyl aryl sulfonic acid; a guanidine salt of monoethyl phenol; and a sodium salt of condensed sulfonic acid. Other typical an-ionic surfactants are disclosed, for example, in Chapter 2 of "Surface Active Agents and Detergents" by A. M. Schwartz, J. S. Perry and J. Berch (vol. 2, 1958, Interscience Publishers, New York). When used, the an-ionic dispersant is included in amounts between about 0.01 and about 1.5 weight percent based on the total weight of the latex paint.

The relative proportions of the several components of the paint composition of this invention may vary to suit individual requirements, and in general, the composition has the following relative relationships, per 100 parts of copolymer resin, all parts being by weight:

| | Parts |
|---|---|
| Vinyl acetate-ethylene copolymer latex (solids basis) | 100 |
| Pigment, e.g. titanium dioxide | 10–1000 |
| Dispersing agent(s) | .5–10 |
| Coalescing solvent | 0–10 |
| Water—sufficient to provide solids content of 40 to 60 percent. | |

It will, of course, be understood that other conventional additives customary in the compounding of water-base latex paints can be included in the paint of this invention.

The invention will now be more specifically illustrated by reference to the following examples of practical application, it being understood that these examples are given for illustrative purposes only and are not limitative of the invention.

EXAMPLE 1

The following is charged to a 25-gal. stainless steel pressure reactor equipped with temperature controls and an agitator:

| | G. |
|---|---|
| Water | 20,000 |
| Igepal 887 | 680 |
| Igepal 630 | 340 |
| Sodium salt of vinyl sulfonic acid | 128 |
| Sodium lauryl sulfate | 38 |
| Citric acid | 56 |
| Disodium phosphate hydrate | 24 |
| Vinyl acetate | 22,600 |

The reactor is then purged with nitrogen and ethylene to remove all oxygen, after which 300 g. of potassium persulfate are added. The charge is heated to 50° C. During the heat-up period ethylene is added to a pressure of 36 atm. and the agitator set at 230 r.p.m. The equilibrium of ethylene between the vapor pocket and dissolved in the vinyl acetate is reached with in 15 min. as indicated by the stoppage of ethylene flow from the supply cylinder to the reactor. Polymerization is then started by adding 25 g. of a 4% Formopon sodium formaldehyde sulfoxylate) solution. The polymerization is completed after 4½ hr. at which time 1,500 g. of 4% Formopon solution has been used and an additional 10 g. of potassium persulfate has been added. The latex is cooled to room temperature and neutralized to pH ~6 ammonia. A vinyl acetate-ethylene copolymer latex is obtained with the following properties:

48% solids
19% ethylene in copolymer
Intrinsic viscosity—2.1—100 ml./g., benzene, 30° C.)
Particle size—0.21
$T_{135}$—0° C.
$T_4$—+6° C.

($T_{135}$ is the temperature at which the torsional modulus is 135,000 lbs./in.$^2$, and $T_4$ the temperature at which the torsional modulus is 10,000 lbs./in.$^2$ determined according to ASTM–D1043–61T.)

The ethylene content is suitable determined by means of the saponification number, in conventional manners.

Intrinsic viscosity is similarly determined by conventional techniques, e.g., in accordance with the procedure described on pages 309–314 of "Principles of Polymer Chemistry" by Paul J. Riory (Cornell University Press—1953), using an Ubbelodhe (suspended level) viscosimeter at 30° C. The determination is made in various solvents such as benzene, acetone, methyl ethyl ketone, and the like.

EXAMPLE 2

To the reactor of Example 1 there is charged 14,500 g. water, 157 g. Cellosize QP–300, 218 g. Igepal 887, 151 g. Igepal 630, and 9 g. acetic acid.

After purging the reactor with nitrogen and ethylene, 20 g. of potassium persulfate is added as a 4% solution. During the heat-up period to 50° C. ethylene is introduced to a pressure of 36 atm. and the agitator is set at 270 r.p.m. Equilibrium between ethylene in the vapor pocket and in the liquid phase is reached in about 15 min. after which the polymerization is started by adding Formopon solution continuously. Potassium persulfate is added incrementally as needed. The polymerization is completed in 10½ hrs.

The resulting latex has the following properties:

Solids—53%
Ethylene content in copolymer—18%
Viscosity—710 cps.
Intrinsic viscosity—2.85 (benzene, 30° C.)
Average particle size—1.3
$T_{135}$—1° C.
$T_4$—+8° C.

As will be seen from the foregoing examples, the unsaturated acid previously mentioned in the discussion of stabilizers can be employed not only in its free acid form but also in the form of a salt such as a sodium salt. Similarly, it will be seen that the specified stabilizing agents can be omitted, and this is particularly true if a small amount, e.g., up to 0.5% based on the latex, of an anionic surfactant is present, or if a colloid substance is formed in the course of the polymerization. The non-ionic surfactant can be of any known type, such as disclosed, for example, in Chapter 2 of "Surface Active Agents and Detergents" by A. M. Schwartz, J. S. Perry and J. Berch (vol. 2, 1958, Interscience Publishers, New York). A particularly suitable anionic surfactant is sodium lauryl sulfate.

EXAMPLE 3

The following paint is prepared by adding the following materials in the quantities indicated to 182 parts of the latex of Example 2:

| | Parts |
|---|---|
| Cellosize QP—440, 3% solution (Hydroxy ethyl cellulose) | 200 |
| Defoamer (Nopco NDW) | 2 |
| Tamol 731 (sodium salt of carboxylated anionic surface-active agent) | 5 |
| Igepal CO–610 (nonyl phenoxy polyoxyethylene ethanol) | 3 |
| Ethylene glycol | 18 |
| Ti-Pure R–610 (titanium dioxide) | 150 |
| Lorite (Calcium carbonate/silicate) | 240 |
| Phenyl mercuric acetate (18% Hg content) | .3 |
| Carbitol acetate (diethylene glycol monoethyl ether acetate) | 10 |
| Water | 292 |
| Latex (Example 2) | 182 |

Paint tests show the paint to have excellent hiding power and scrubbability.

EXAMPLE 4

Again using the latex of Example 2, the following paint formulation is compounded:

| | Parts |
|---|---|
| Cellosize QP–4400, 3% solution | 125 |
| Polyglycol P–1200 (polypropylene glycol) | 3 |
| R and R 551 (lecithin) | 5 |
| Surfynol TG (mixture of ditertiary acetylenic glycol and nonyl phenol ethylene oxide adduct) | 3 |
| Ethylene glycol | 20 |
| Nopco NDW (defoamer) | 2 |
| Ti–Pure 510 | 225 |
| Talc (Nytal 300) | |
| Phenyl mercuric acetate (18% mercury) | 8 |
| Water | 169 |
| Carbitol (diethylene glycol monoethyl ether) | 16 |
| Latex (Example 2) | 418 |

Exposure results with this paint are excellent in comparison with a commercial vinyl acrylic, and with Rhoplex AC–34, an all acrylic paint.

EXAMPLE 5

The latex of Example 1 is compounded into a paint of the following formulation:

| | Parts |
|---|---|
| Cellosize QP–4400 (3% solution) | 190 |
| Tamoi 731 | 5 |
| Igepal CO–610 | 1.5 |
| Nopco NDW | 3 |
| Ethylene glycol | 25 |
| Ti–Pure R–510 (titanium dioxide) | 120 |
| Zeolex 80 (hydrated sodium silica aluminate) | 40 |
| Witcarb R (precipitated calcium carbonate) | 100 |
| Talc (Asbestine 3X) | 150 |
| Phenyl mercuric acetate | 0.3 |
| Carbitol acetate | 8 |
| Igepal CO–610 | 1.5 |
| Water | 265 |
| Latex (Example 1) | 215 |

This paint has good washability, it shows excellent touchup, color uniformity and excellent fusion at 38° F. Clear films of this paint have better elongation than commercial vinyl acetate copolymers.

Touchup qualities are determined by making large area brushouts of tinted samples of the test paint over both previously painted and new gypsum board. At periods of 1 hour, 1 day and 3 days small areas are repainted, and when dry rated for lack of color uniformity, sheen uniformity or any other visual defect which would render the touched up area more apparent than the surrounding area.

Washability tests are conducted in accordance with Federal Test Method Standard No. 141, method 6142, except that the drying time is shortened to 48 hours at 72° F.±2°, with no bake cycle at the end. Wet abrasion resistance is also checked in the same manner, by using a 50% slurry of Ajax cleanser in water to replace the 0.5% Ivory solution.

To determine low temperature fusion properties, a .003 mil Bird applicator, a Morest chart form HC (glued to a glass panel for rigidity) and the test paint tinted medium blue are preconditioned for one hour in a special cooler set at 40° F.±1°. The paint is then drawn down and allowed to dry for 18 hours at this temperature, after which it is visually rated for color uniformity.

EXAMPLE 6

A stainless steel autoclave equipped with agitator, two liquid and one gas feed lines, temperature and pressure sensing and recording devices and a water-filled jacket for cooling and heating was purged with nitrogen and then with ethylene. An initial charge, the composition of which is indicated in Table 1, was added in two streams, one consisting of vinyl acetate and the other of the remaining ingredients as an aqueous solution. The agitator was started and the reactor pressured with ethylene to 190 p.s.i.g. The temperature was then raised to 86° C. over a 45-minute period. Subsequently, the ethylene pressure was raised to 420 p.s.i.g. and the continuous feeds, the compositions of which are indicated in Table 1, were started. During the continuous feed period of two hours the temperature was held at 77±2° C. and the pressure at 420 p.s.i.g. Ten minutes later 0.36 part of ammonium persulfate in 3.03 parts of water was added. The temperature was then raised to 90° C., over a 20-minute period with the pressure at 420 p.s.i.g. and held for 30 minutes. The vessel was then depressurized and 0.34 part of Colloid 581B (antifoam) added subsequent to which the product was cooled to room temperature and 0.94 part of ammonium thiosulfate in 6.64 parts of water added.

The latex had a solids content of 55%, a Brookfield viscosity (25° C., #2 spindle, 60 r.p.m.) of 250, and a pH of 4.7–5.7. The composition of the polymer by weight was 88 percent vinyl acetate, 11.6 percent ethylene, and 0.4 percent acrylic acid. The polymer particle size and intrinsic viscosity is 0.1 to 2 and 1–2.5 dl./g. (benzene at 30° C.), respectively.

TABLE 1

|  | Initial charge, parts | Continuous feeds, parts | |
| --- | --- | --- | --- |
|  |  | Aqueous [1] | Organic [2] |
| Anionic surfactant [3] | 1.22 | 6.93 |  |
| Do.[4] | 2.37 | 13.44 |  |
| Potassium bicarbonate | .17 | .94 |  |
| Hydroxyethylcellulose [5] | .92 | .93 |  |
| Ammonium persulfate | .56 | .91 |  |
| Water | 203 | 82.8 |  |
| Vinyl acetate | 32.5 |  | [6] 292 |
| Acrylic acid |  |  | 1.47 |

[1] At a constant rate of 0.87 part/min.
[2] At a constant rate of 2.45 parts min.
[3] "Triton" X 305 (70% solution of actylphenyl polyether alcohol—30 ethylene oxide units per molecule).
[4] "Ultrawet" K Soft (sodium dodecyl benzene sulfonate).
[5] "Natrosol" 300—deg. of substitution, 3.0—low viscosity.
[6] Only vinyl acteate added for the first 6 minutes.

With the latex of Example 6 a paint (50.1 PCV—pH 9) was formulated by mechanically mixing together in the customary fashion the following grind and reduction:

Ingredients:
  Grind: Parts
    Water _____ 110.0
    "Tamol" 731 dispersing agent _____ 10.0
    Potassium tripolyphosphate _____ 1.0
    Propylene glycol _____ 25.0
    "Nuodex" PMA–18 fungicide _____ .5
    Hercules defoamer 357 _____ 1.0
    Ti-Pure [1] R–901 titanium dioxide _____ 199.9
    "Santintone" No. 1 calcined clay _____ 75.0
    ASP 400 clay _____ 75.0
    "Methocel" 65HG 4000, 2% _____ 50.0
    "Snowflake" whiting _____ 50.0
    "Celite" 281 diatomaceous silica _____ 25.0

Reduction: Parts
    2-amino-2-methyl-1-propanol _____ 4.0
    "Abex" 18S surfactant _____ 4.0
    "Methocel" 65HG 4000, 2% _____ 229.9
    Water _____ 24.0
    Hercules defoamer 357 _____ 1.0
    Example 6 latex _____ 254.9

[1] Registered trademark, E. I. du Pont de Nemours and Company.

The above paint was exceptionally superior as evidenced by the following properties:

Consistency—83 K.U.
Heat stability (5 days at 140° F.)—80 K.U.
Freeze-thaw stability (16 hrs. at 0°/8 hrs., at 74° F.)—greater than 5 cycles
Scrub resistance (ASTM D2486–T66)—310 cycles
Hiding power (0.0027″ wet film drawdown), contrast ratio—0.947
SX—6.2
Theor. 1-mil coverage/gallon—527 sq. ft.

What is claimed is:
1. An aqueous paint composition for application to a supporting wooden or gypsum board surface comprising a synthetic polymer latex, a pigment, and, based on the weight of the paint, 0.1–3 percent cellulosic thickener selected from the group consisting of methyl cellulose, hydroxyethyl cellulose and carboxymethyl cellulose, said synthetic polymer latex comprising an aqueous medium having dispersed therein a vinyl acetate-ethylene copolymer containing 5 to 40% ethylene in the copolymer, said copolymer being further characterized by an intrinsic viscosity of 1 to 2.5 deciliters per gram as measured in benzene at 30° C., and said dispersed copolymer having a particle size of $0.1\mu$ to $2\mu$, said paint having a solids content of 45 to 60 percent by weight and said pigment being present in an amount of 10 to 1000 parts by weight per 100 parts by weight of said vinyl acetate-ethylene latex solids.

References Cited
UNITED STATES PATENTS 3,337,482  8/1967  Watanabe et al. __ 260—17.4ST
3,440,199  4/1969  Lindemann et al. __ 260—29.6TA WILLIAM H. SHORT, Primary Examiner L. M. PHYNES, Assistant Examiner U.S. Cl. X.R.

117—148; 260—29.6, 87.3

Notice of Adverse Decisions in Interferences

In Interference No. 98,176 involving Patent No. 3,578,618, H. P. Beardsley, VINYL ACETATE-ETHYLENE COPOLYMER AQUEOUS PAINT COMPOSITIONS, final judgment adverse to the patentee was rendered Sept. 12, 1973, as to claim 1.

[*Official Gazette December 25, 1973.*]